United States Patent [19]
Burdick

[11] 3,891,048
[45] June 24, 1975

[54] AIR BEARING TRANSPORTER HAVING MULTIDIRECTIONAL DRIVE UNIT
[75] Inventor: Robert E. Burdick, Goleta, Calif.
[73] Assignee: Rolair Systems, Inc., Santa Barbara, Calif.
[22] Filed: July 30, 1973
[21] Appl. No.: 384,090

[52] U.S. Cl............................. 180/119; 280/43.23
[51] Int. Cl............................................. B60v 1/00
[58] Field of Search ............ 180/116, 119, 124, 52, 180/66 R, 66 F, 24.02, 6.48, 180/6.5, 280/91, 47.11, 97, 43.23

[56] References Cited
UNITED STATES PATENTS

| 988,287 | 3/1911 | Thorp | 180/52 |
|---|---|---|---|
| 3,126,208 | 3/1964 | De Voghel | 280/47.11 |
| 3,173,510 | 3/1965 | Smith | 180/119 |
| 3,433,320 | 3/1969 | Bresnahan | 180/124 |
| 3,616,869 | 11/1971 | Rilling | 180/6.48 |
| 3,618,968 | 11/1971 | Greer | 280/47.11 |
| 3,756,342 | 9/1973 | Burdick | 180/124 |

Primary Examiner—Stanley H. Tollberg
Assistant Examiner—H. Grant Skaggs, Jr.
Attorney, Agent, or Firm—Harris, Kern, Wallen & Tinsley

[57] ABSTRACT

A multidirectional drive unit for an air bearing transporter disposed in a recess in the lower side of the platform of the transporter and having coaxial drive wheels engageable with the transporter supporting surface. The drive unit is rotatable in its recess about a vertical axis and is extensible downwardly to bring the drive wheels into engagement with the supporting surface, the drive unit being retractable upwardly into its recess when not in use. The drive unit includes motor means for selectively driving the wheels in the same or opposite directions, whereby the wheels either propel the transporter in a given direction, depending on the orientation of the wheels, or rotate the drive unit relative to the transporter to reorient the wheels preparatory to propelling the transporter in a different direction at an angle to the first direction mentioned. Locking means are provided for locking the drive unit against rotation in any of at least two positions angularly spaced apart by 90° so that the transporter may be driven forwardly, rearwardly, to the left, or to the right, the locking means providing for vertical movement of the drive unit relative to the transporter between the extended and retracted positions of the drive unit.

6 Claims, 14 Drawing Figures

PATENTED JUN 24 1975 3,891,048

SHEET 1

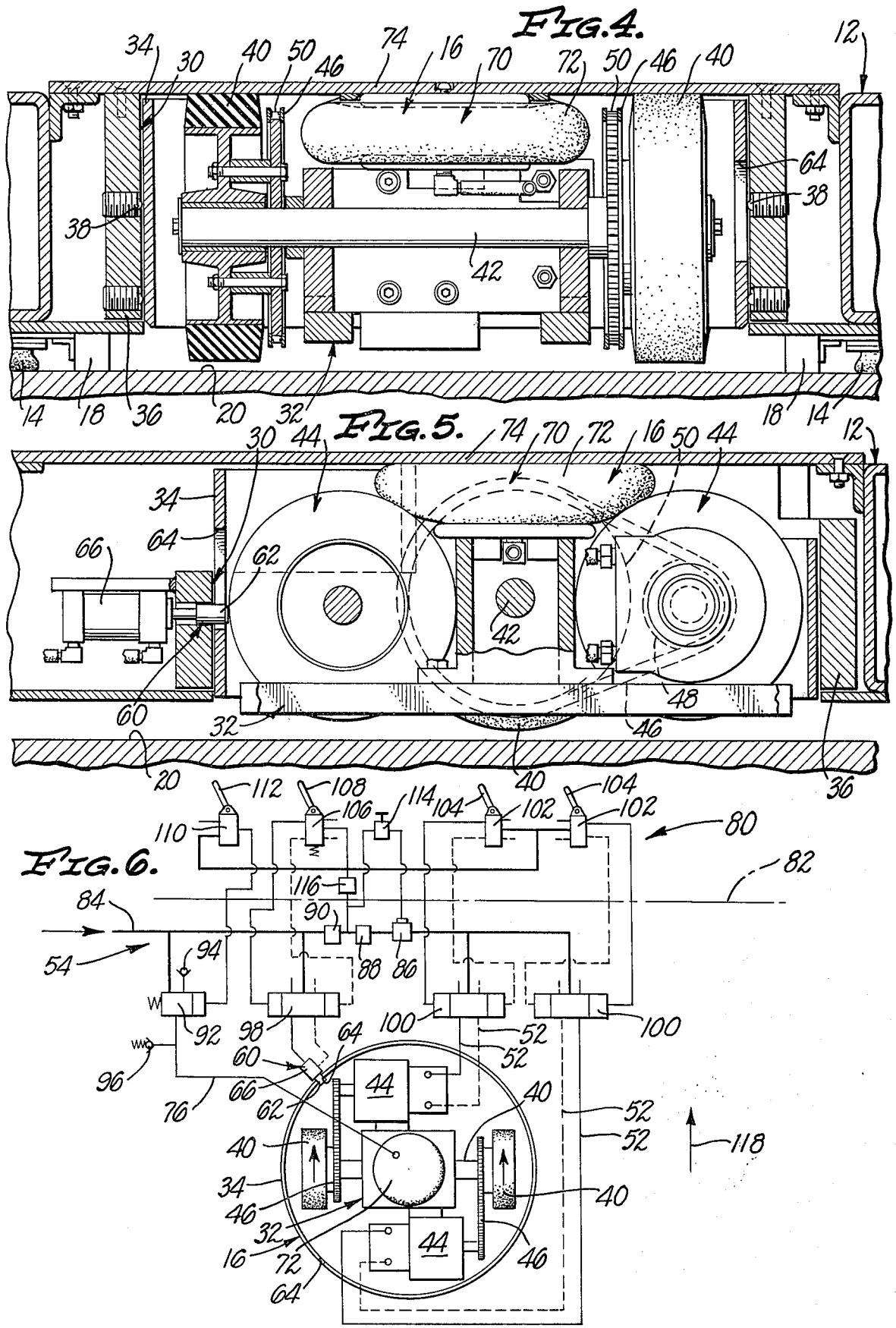

3,891,048

AIR BEARING TRANSPORTER HAVING MULTIDIRECTIONAL DRIVE UNIT

BACKGROUND OF INVENTION

The present invention relates in general to air bearing transporters and, more particularly, to a drive unit for such a transporter.

Generally speaking, an air bearing or air cushion transporter includes a platform, or the equivalent, for carrying a load and a plurality of air bearings for maintaining the platform above the transporter supporting surface on thin films of air which provide very low friction so that heavy loads are easily moved along the supporting surface. A typical air bearing transporter is shown in my U.S. Pat. No. 3,756,342.

Air bearing transporters are propelled over their supporting surfaces in various ways. For example, transporters carrying light loads are usually propelled manually. Heavily loaded transporters may be pushed or pulled by external drive units, such as tractors. A third way is to provide a drive unit permanently connected to the platform itself, the present invention relating to this type of drive unit.

OBJECTS AND SUMMARY OF THE INVENTION

The primary object of the present invention is to provide a multidirectional drive unit for an air bearing transporter which is disposed in a recess in the lower side of the platform of the transporter to maintain a low profile, the air bearings being circumferentially spaced around the drive unit.

More particularly, an important object is to provide a drive unit which is rotatable in its recess about a vertical axis to vary the direction in which the transporter is driven, and which is vertically movable in its recess between a lower, extended position wherein it engages the transporter supporting surface and an upper, retracted position wherein it is disengaged therefrom.

Another important object is to provide means for locking the drive unit in any of at least two orientations angularly spaced apart by 90°, and to make the drive unit bidirectional, whereby the transporter may be driven forwardly, rearwardly, to the left, or to the right.

Still another important object is to provide a drive unit which includes coxial drive wheels spaced apart by 180° about the vertical axis of the drive unit and to provide motor means for selectively driving the wheels in either the same or opposite directions, whereby the wheels either propel the transporter in a given direction, dependent on the orientation of the wheels, or rotate the drive unit relatively to the transporter to reorient the wheels preparatory to propelling the transporter in a different direction at an angle to the first direction mentioned.

The invention may be summarized as including, and yet another important object is to provide a drive unit for an air bearing transporter which includes: a drive unit supporting structure in the recess in the platform of the transporter and movable vertically in such recess and rotatable therein about a vertical axis; coxial drive wheels rotatably mounted on the supporting structure and circumferentially spaced apart about the vertical axis by 180°; reversible motor means on the supporting structure for selectively driving the wheels in either the same or opposite directions, whereby the wheels either propel the transporter in a given direction, dependent on the orientation of the wheels, or rotate the supporting structure relative to the transporter to reorient the wheels preparatory to propelling the transporter in a different direction at an angle to the first direction; locking means on the transporter and the supporting structure for locking the supporting structure against rotation in any of at least two positions angularly spaced apart by 90°, the locking means including means providing for vertical movement of the supporting structure relative to the transporter; and actuating means for extending and retracting the supporting structure between a lower, extended position wherein the drive wheels are in engagement with the transporter supporting surface and an upper, retracted position wherein the drive wheels are out of engagement with such surface. A related object is to provide an actuating means for extending and retracting the supporting structure which is inflatable and deflatable.

A further object is to provide a drive unit wherein the motor means includes reversible air motors respectively connected to the drive wheels.

Still another object is to provide remote control means for energizing the air motors in the same or opposite directions, and for inflating or deflating the actuating means for extending and retracting the drive unit supporting structure.

The foregoing objects, advantages, features and results of the present invention, together with various other objects, advantages, features and results thereof which will be evident to those skilled in the air bearing transporter art in the light of this disclosure, may be achieved with the exemplary embodiment of the invention illustrated in the accompanying drawings and described in detail hereinafter.

DESCRIPTION OF DRAWINGS

In the drawings:

FIGS. 4 and 5 are vertical sectional views through the drive unit respectively taken along the arrowed lines 4—4 and 5—5 of FIG. 3;

FIGS. 6 to 10 are schematic views of the multidirectional drive unit of the invention and a remote control system therefor, and illustrate the operation of the invention;

DESCRIPTION OF EXEMPLARY EMBODIMENT OF INVENTION

Figure 1:
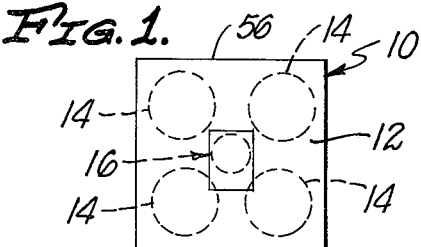
FIG. 1 is a plan view on a reduced scale of an air bearing transporter which incorporates a multidirectional drive unit of the invention.

Referring initially to FIG. 1 of the drawings, illustrated therein is an air bearing transporter 10 which comprises a platform 12 carrying four air bearings 14 on its lower side circumferentially spaced apart around a multidirectional drive unit 16 of the invention. As shown in FIG. 4 of the drawings, the lower side of the platform 12 is also provided with skids 18 which engage the transporter supporting surface 20 when the air bearings 14 are deflated.

Figure 2:
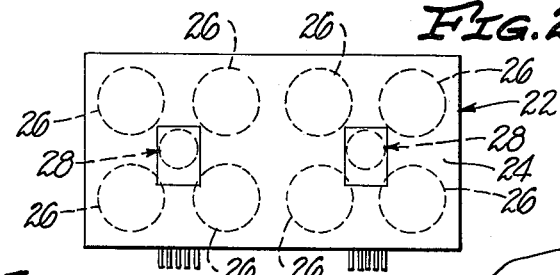
FIG. 2 is a view similar to FIG. 1, but showing a larger air bearing transporter incorporating two of the multidirectional drive units of the invention.
Figure 3:
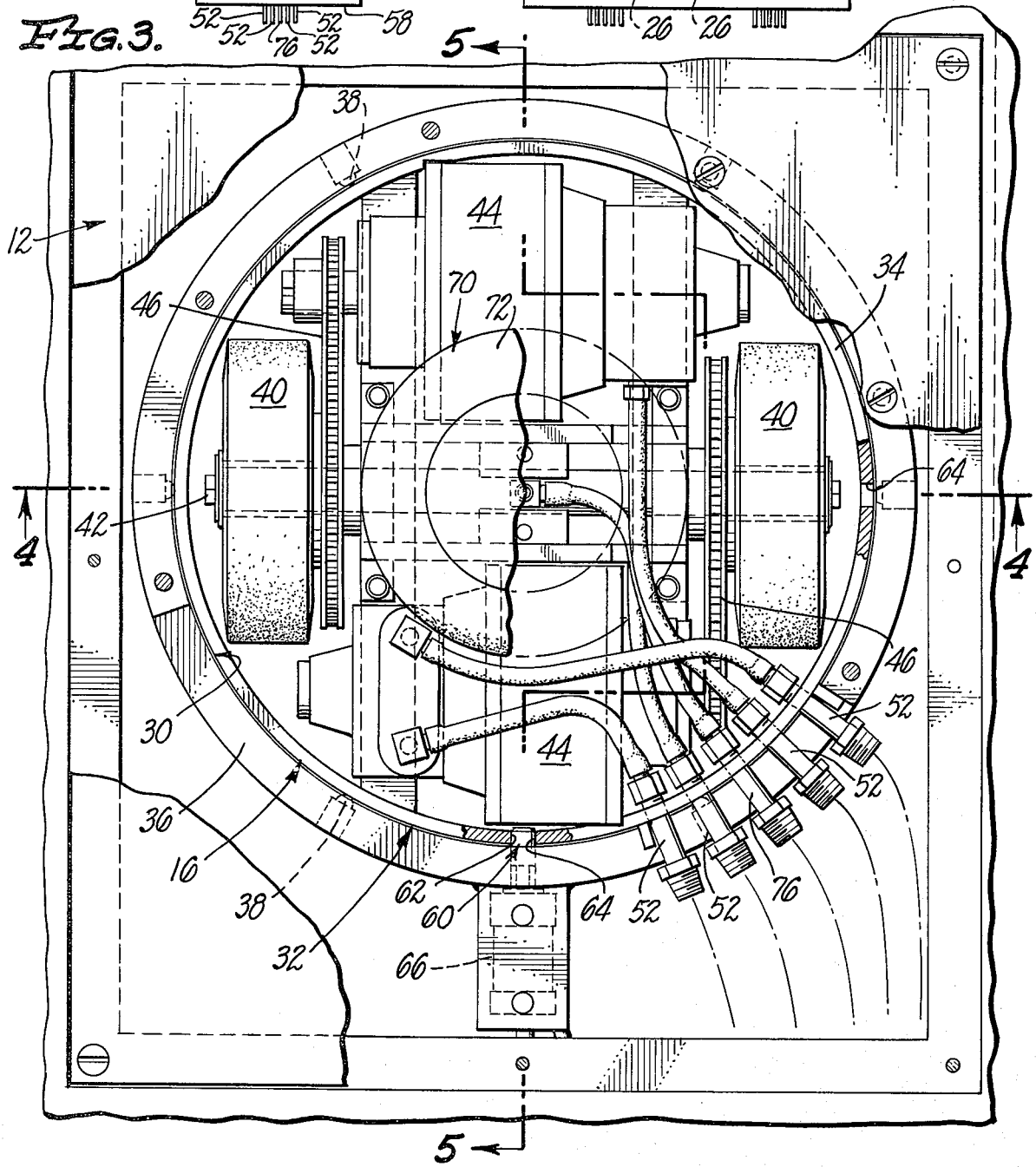
FIG. 3 is a plan view on an enlarged scale of the multidirectional drive unit itself, parts of the transporter platform being broken away to reveal the drive unit.

FIG. 2 of the drawings shows a larger air bearing transporter 22 which includes a platform 24 having on its lower side two groups of air bearings 26 respectively circumferentially spaced apart around multidirectional drive units 28 of the invention. The drive units 28, and their relationships to the platform 24 and the air bearings 26, are the same as the drive unit 16, and its relationship to the platform 12 and the air bearings 14. Consequently, only the drive unit 16 of the transporter 10 is covered in detail in the drawings and the following description.

The platform 12 of the air bearing transporter 10 may be of any suitable construction and is provided in its lower side with a cylindrical recess 30 which houses the drive unit 16 for rotation about a vertical axis and upward and downward movement between retracted and extended positions, the drive unit being shown retracted in FIGS. 4 and 5. More particularly, the drive unit 16 comprises a supporting structure 32 which includes a cylindrical sleeve or "can" 34 disposed within a cylindrical wall 36 defining the recess 30. The sleeve 34 rotates in and moves vertically of the recess 30 on bearings 38 carried by the wall 36.

Carried by the portion of the supporting structure 32 within the sleeve 34 are coaxial drive wheels 40 rotatably mounted on a common shaft 42 forming part of the supporting structure. The wheels 40 are driven by reversible air motors 44, respectively, mounted on the supporting structure 32 and connected to the respective wheels by chains 46 trained around sprockets 48 on shafts of the motors 44 and sprockets 50 connected to the wheels 40. The air motors 44 are of the type having integral gear reducers. Each air motor 44 has two air lines 52 connected thereto, the direction of motor rotation depending upon which air line is pressurized. The air lines 52 lead to a remote control means 54, diagrammatically shown in FIG. 6, which may simply be a hand held control unit, not shown, used by the operator to guide the transporter 10.

Assuming that the drive wheels 40 are in engagement with the supporting surface 20, as will be described hereinafter, it will be apparent that driving both wheels in the same direction will result in movement of the transporter 10 in a direction depending upon the orientation of the wheels. If both wheels 40 are driven in the opposite direction with the same orientation, the transporter 10 will be displaced in the opposite direction. These two directions may, for example, be regarded as forward and rearward directions and may be perpendicular to what can be regarded as the forward and rearward ends 56 and 58, FIG. 1, of the transporter 10.

If the remote control means 54 is operated to cause the wheels 40 to rotate in opposite directions, as will be described hereinafter, the drive unit 16 simply rotates in its recess 30 to change the orientation of the wheels. While the wheels 40 conceivably could rotate the drive unit 16 into any orientation, for movement of the transporter 10 in either direction along such orientation, the drive unit 16 is preferably restricted to a fore-and-aft orientation, or a lateral orientation at right angles thereto, a change from one orentation to the other being effected by rotating the wheels 40 in opposite directions. With a fore-and-aft orientation, the transporter 10 may be propelled forwardly or rearwardly, depending upon the direction of wheel rotation. With a lateral orientation for the drive unit 16, the transporter 10 may be propelled to the left, or to the right, again depending upon the direction of wheel rotation.

To limit the drive unit 16 to the fore-and-aft and lateral orientations mentioned, the drive unit incorporates a locking means 60 comprising a locking pin 62, FIG. 5, insertable into either of a pair of vertical slots 64 in the sleeve 34 and spaced 90° apart. As will be apparent, retraction of the locking pin 62 from the particular slot 64 in which it is disposed permits rotation of the drive unit 16 from one orientation to the other upon oppositely rotating the wheels 40 in the proper direction. (It will be understood that the drive unit 16 may be rotated about its vertical axis with the drive unit extended, or retracted. Normally, such rotation will be effected with the drive unit 16 extended so that the wheels 40 are in engagement with the transporter supporting surface 20.) The locking means 60 includes an air cylinder 66 for extending and retracting the locking pin 62. The vertical slots 64 permit extension and retraction of the drive unit 16 with the locking pin 62 in one of the slots 64.

The drive unit 16 includes actuating means 70 for extending the drive unit downwardly and retracting it upwardly. As hereinbefore pointed out, the wheels 40 engage the transporter supporting surface 20 when the drive unit is extended downwardly, and are clear of the supporting surface when the drive unit is retracted upwardly, the latter condition being shown in FIGS. 4 and 5 of the drawings.

The actuating means 70 comprises simply an inflatable member 72 disposed between and engaging the supporting structure 32 of the drive unit 16 and the upper wall 74 of the recess 30. An air line 76 is connected to the inflatable member 72 and extends to the control means 54. To extend the drive unit 16 downwardly, the member 72 is inflated through the air line in a manner to be described. To retract the drive unit 16, the following operations are performed: The inflatable member 72 is exhausted to the atmosphere through the air line 76; the air bearings 14 are exhausted, whereupon the weight of the platform 12, and any load thereon, compresses the inflatable member 72; a valve 92 (to be described) connected to the air line 76 is closed; and the air bearings 14 are then pressurized. This results in lifting of the platform 12 clear of the transporter supporting surface 20 with the drive unit 16 retracted. The manner in which these operations are carried out will be considered hereinafter in describing and explaining the operation of the remote control means 54.

Considering an important attribute of the invention as thus far described, it provides the transporter 10 with the multidirectional drive unit 16 in a very compact and low profile construction. In other words, locating the drive unit 16 in the recess 30 in the underside of the platform 12 does not increase the height of the transporter 10, which is an important feature.

Description of Remote Control Means 54 and of the Operation of the Invention

The remote control means 54 includes various components on the transporter 10 and others in a remote, preferably hand held, control unit 80. The transporter carried components are shown below the dot-dash line 82 in FIG. 6, and those carried by the control unit 80 are shown above such line.

Figure 8:
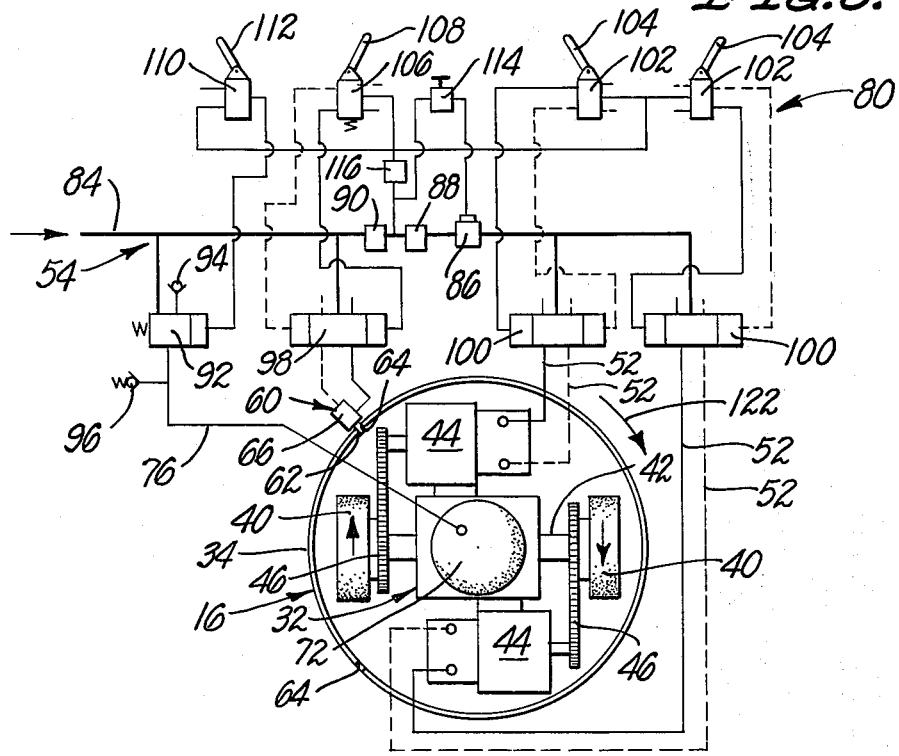
Figure 9:
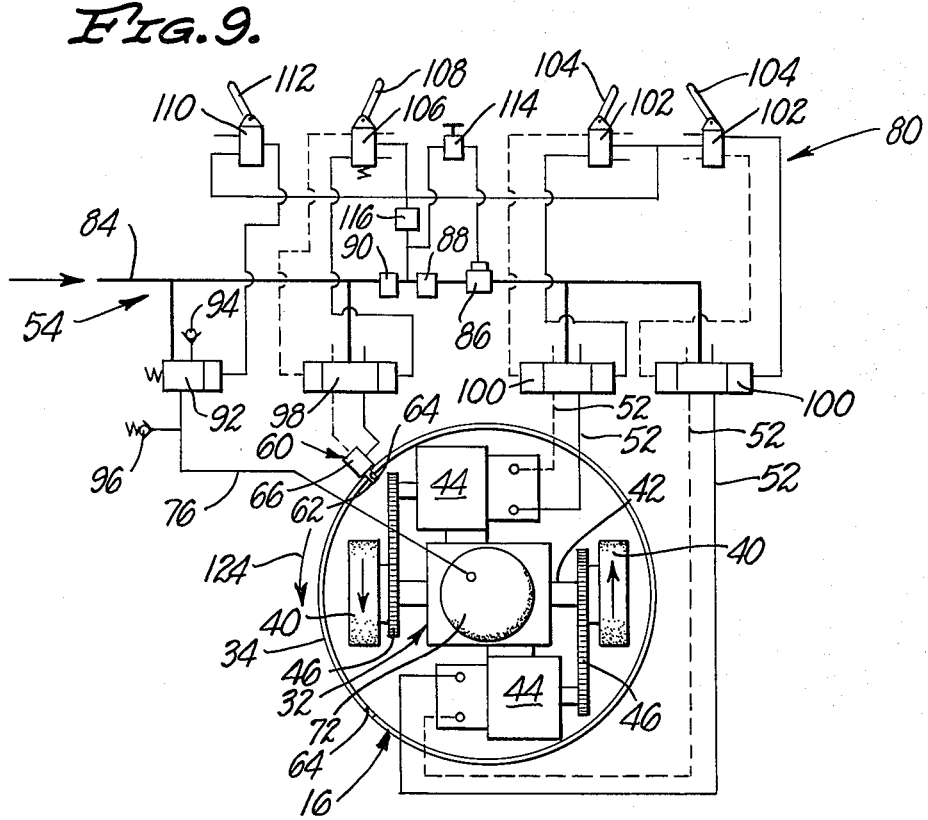
Figure 10:
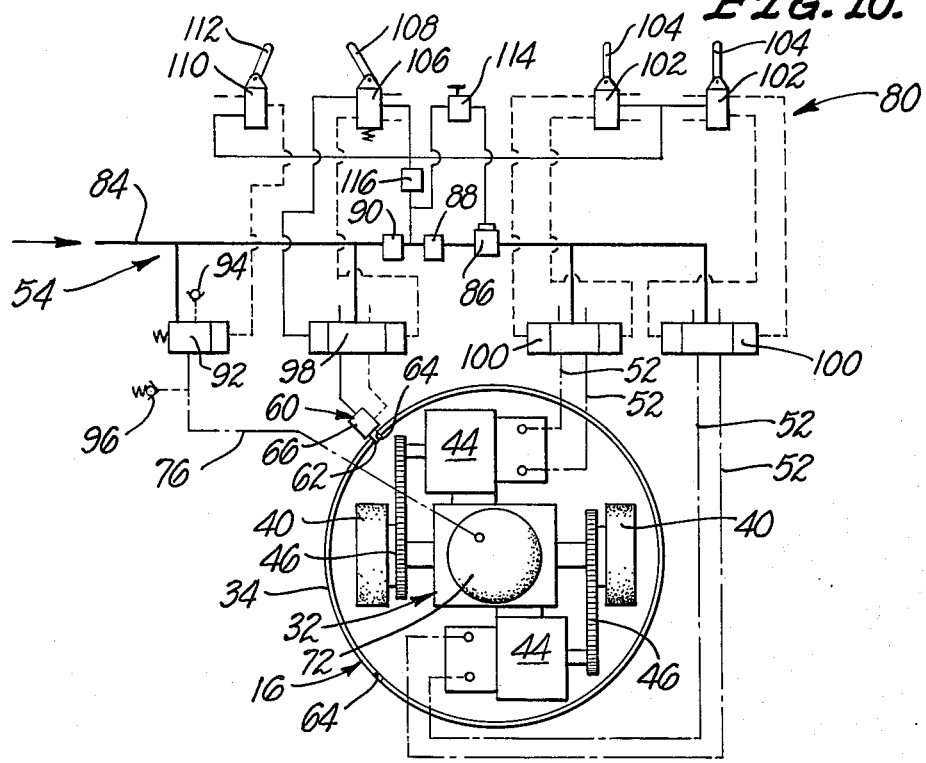

Throughout FIGS. 6 to 10, the various air lines containing air at the desired operating pressure are shown solid, while the various air lines which are at exhaust pressure, i.e., open to the atmosphere, are shown dotted. In FIG. 10, certain air lines are closed with air locked therein at atmospheric pressure, and such air lines are shown by dot-dash lines.

Considering the components of the remote control means 54 which are carried by the transporter 10, these include: a main air supply 84; a pilot pressure operated regulator 86; a lubricator 88; an air filter 90; a pilot pressure operated, three way, two position, in-pilot return, normally closed valve 92 having a check valve 94 opening to the atmosphere connected thereto; a pressure relief valve 96 opening to the atmosphere and connected to the air line 76; a pilot pressure operated, four way, two position valve 98; and two pilot pressure operated; four way, two position, spring centered, closed center valves 100. The components of the remote control unit 80 are: two four way, three position, detented, open center valves 102 operated by manual actuators 104; a four way, two position, spring returned valve 106 operated by a manual actuator 108; a three way, two position, detented valve 110 operated by a manual actuator 112; a manually adjustable regulator 114 for controlling the speeds of the motors 44; and another regulator 116. The stub lines extending from the various valves 92, 98, 100, 102, 106 and 110 exhaust to the atmosphere. The components listed in this paragraph are connected to each other and to those described previously in the manner shown in FIGS. 6 to 10 so that no further description is necessary.

Figure 7:
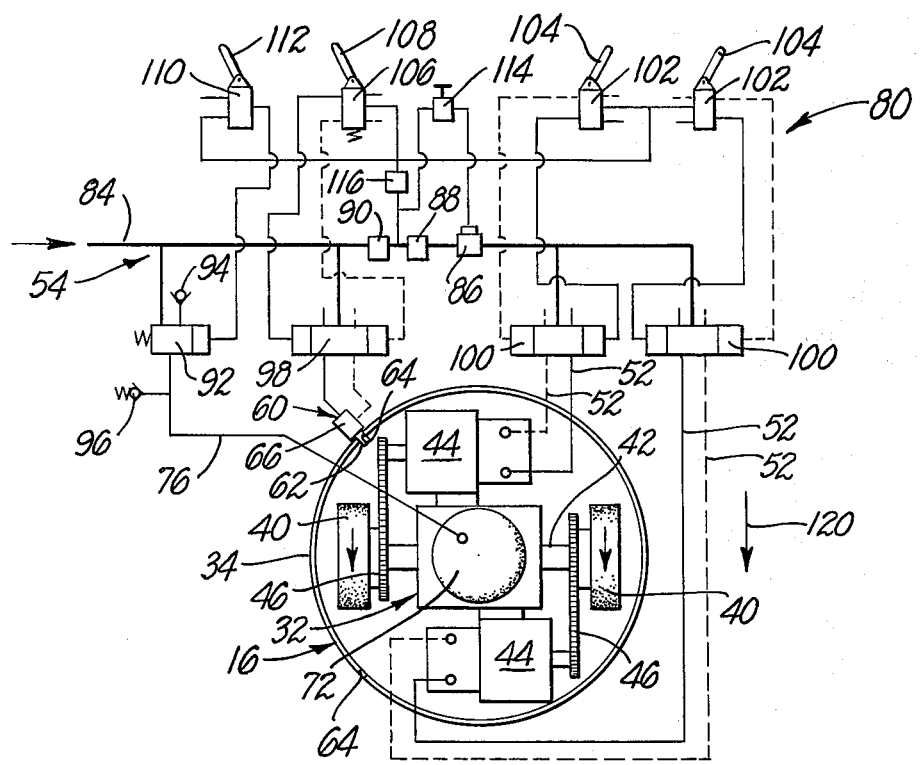

Considering the operation of the invention, FIG. 6 shows the settings of the actuators 104, 108 and 112 to achieve forward motion, indicated by the arrow 118. FIG. 7 shows the actuator settings to achieve rearward motion, indicated by the arrow 120. FIGS. 8 and 9 respectively show the actuator settings for clockwise rotation of the drive unit 16 to a lateral orientation and counterclockwise rotation to the original orientation, as indicated by the arrows 122 and 124. (It will be understood that left and right motions may be achieved with the actuator settings of FIGS. 7 and 6 after 90° of clockwise rotation of the drive unit 16 from the position shown.) FIG. 10 shows the conditions obtaining to maintain the drive unit 16 retracted.

Alternate Modes of Operation

Figure 11:
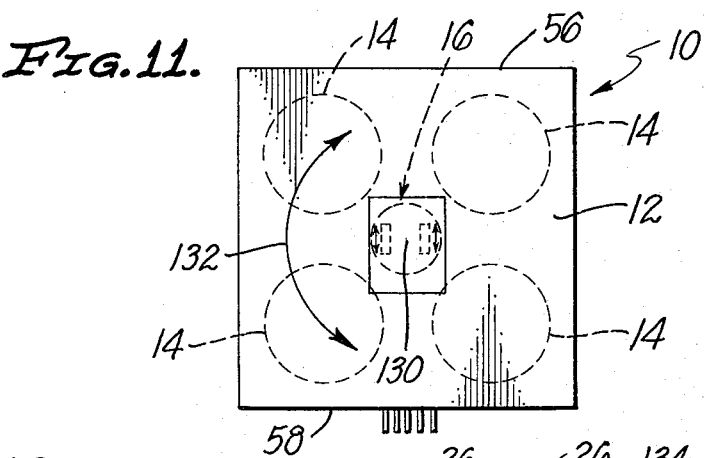
FIG. 11 illustrates an alternate mode of operation of the embodiment of FIGS. 1 and 3 to 10.

Referring to FIG. 11, the transporter 10 can be propelled in various directions with the forward end 56 leading at all times, if desired. This is accomplished very simply by rotating the wheels 40 in opposite directions without retracting the locking pin 62, the air bearings 14 being inflated and the drive unit 16 being extended downwardly. Thus, the transporter 10 simply rotates about the central axis 130 of the transporter and the drive unit, as indicated by the double-headed arrow 132.

Figure 12:
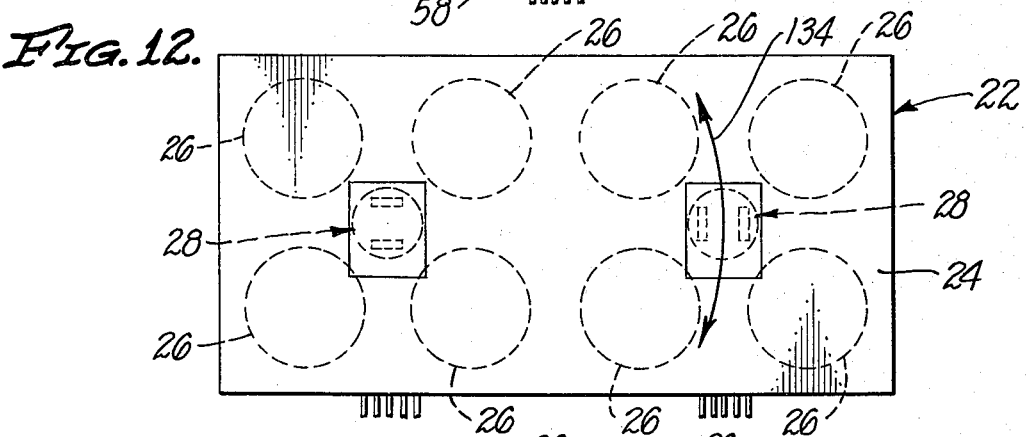
FIGS. 12 to 14 illustrate alternate modes of operation of the embodiment of FIG. 2.
Figure 13:
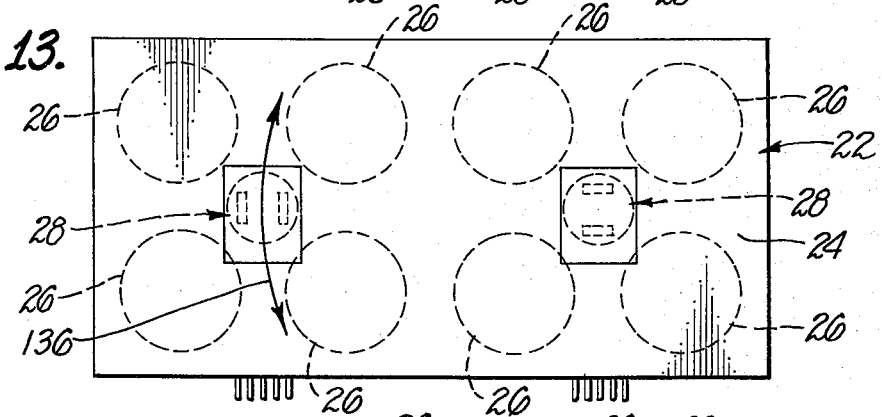
Figure 14:
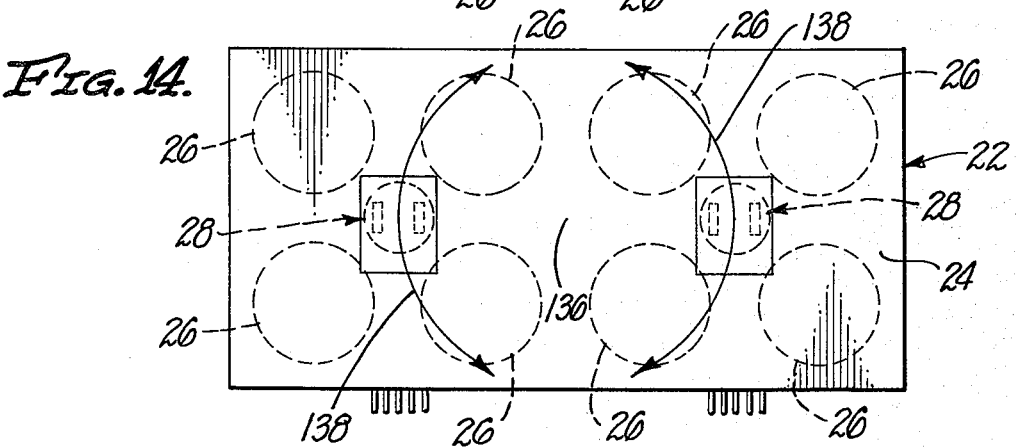

The transporter 22 of FIG. 2 can be turned in various ways, as shown in FIGS. 12 to 14.

Referring to FIGS. 12 and 13, the transporter 22 can be rotated in either direction about the central axis of either drive unit 28, as indicated by the double-headed arrows 134 and 136. In both cases, the air bearings 26 are inflated and the drive units 28 extended downwardly. In FIG. 12, both motors 44 of the right drive unit 28 are energized in the same direction with the corresponding locking pin 62 extended, and the left drive unit is not energized. The reverse is true of FIG. 13.

In FIG. 14, the transporter 22 can be rotated in either direction about its central axis 136, as indicated by the double-headed arrows 138. In this case, the air bearings 26 are inflated, the drive units 28 are extended downwardly, the locking pins 62 are extended, and the drive units are energized in opposite directions.

Although exemplary embodiments have been disclosed for purposes of illustration, it will be understood that various modifications fall within the bounds of the invention as hereinafter claimed.

I claim as my invention:

1. In a multidirectional drive unit for an air bearing transporter which includes a platform carrying air bearings on its lower side and having a recess in such lower side, the combination of:
   a. a drive unit supporting structure in said recess and rotatable therein about a vertical axis;
   b. two drive wheels rotatably mounted on said supporting structure and spaced from said vertical axis, said drive wheels being in coaxial relation and spaced apart by 180° about said vertical axis;
   c. motor means on said supporting structure for selectively driving said wheels in the same or opposite directions;
   d. whereby said wheels either propel the transporter in a given direction, dependent on the orientation of said wheels, or rotate said supporting structure relative to the transporter to reorient said wheels preparatory to propelling the transporter in a different direction at an angle to the first direction mentioned;
   e. with said supporting structure vertically movable in said recess between a lower, extended position in which said drive wheels are engageable with a transporter supporting surface and an upper, retracted position, and the drive unit including actuating means for extending and retracting said supporting structure; and
   f. locking means on the transporter and said supporting structure for locking said supporting structure against rotation in any of at least two positions angularly spaced apart by 90°, said locking means including means providing for vertical movement of said supporting structure relative to the transporter.

2. A drive unit as defined in claim 1 wherein said actuating means includes inflatable means engaging the transporter and said supporting structure for extending the latter downwardly.

3. A drive unit according to claim 1 wherein said motor means includes reversible air motors respectively connected to said wheels.

4. A drive unit as set forth in claim 3 including remote control means for energizing said air motors in the same or opposite directions.

5. A drive unit as defined in claim 1 wherein the recess in the transporter and said supporting structure are cylindrical.

6. A construction as defined in claim 1 wherein the air bearings are circumferentially spaced around said drive unit.

* * * * *